Figure 2:
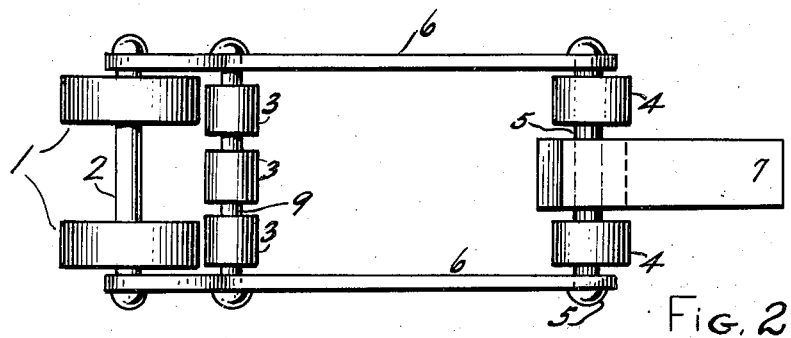

April 23, 1940. D. R. KNAPP 2,198,438
WHEEL TRUCK
Filed Nov. 1, 1938

INVENTOR.
David R. Knapp

Patented Apr. 23, 1940

2,198,438

UNITED STATES PATENT OFFICE 2,198,438

WHEEL TRUCK

David R. Knapp, Philadelphia, Pa., assignor to Rol-A-Way Truck Company, Philadelphia, Pa., a corporation of Pennsylvania Application November 1, 1938, Serial No. 238,135

2 Claims. (Cl. 280—61)

My invention relates to that class of devices known as trucks and more particularly to those kind adaptable to support a wheel such as found on automobiles or similar vehicles.

It often happens that while driving an automobile one of the wheels becomes inoperative due to some mechanical defect but more often from a deflated tire. If road repairs are not made, the vehicle becomes a road hazard if operated in such a damaged condition.

In the case of a deflated tire a driver is sometimes forced to, or elects to, drive the vehicle in such a damaged condition due to the absence of spare parts or from personal inclinations, assuming such a road risk, until a repair shop is reached where the necessary repairs may be made. In the case of some mechanical damage, such as a broken bearing, or where it is impossible to operate the vehicle under any condition, then a tow car must be engaged for transportation to a repair shop.

If a driver elects to change a tire on the road, especially a busy thoroughfare, the repair work becomes a hazard due to the passing vehicles. If he elects to operate the vehicle with a deflated tire, it is obvious that serious damage will ensue to the tire and inner tube therefor with the attending replacement expense. In the case of mechanical damage to the wheel where the services of a tow car will be required, it is quite obvious that considerable expense will be encountered, not counting the loss of time in obtaining the services of such equipment.

It is also quite obvious that the place to make repairs for such breakdowns are either in a repair shop or at some convenient location that lends itself to safety and convenience and where spare parts are readily available. However, it seldom happens that breakdowns occur in such favorable locations but generally on the road where much trouble is experienced in restoring the vehicle to a normal operating condition.

In view of the above it is the object of my said invention to provide a means and mechanism to move a vehicle with safety, when a wheel on the said vehicle is inoperative or in a damaged condition as aforesaid, under the vehicle's own power, to a repair shop or until a point is reached where the necessary repairs may be made with convenience. A further object is to provide an emergency device for receiving a vehicle wheel and supporting the vehicle with the aforesaid wheel held out of contact with the road, the device being automatically controlled by the movement of the vehicle to elevate and position the wheel thereon. Another object is to provide an emergency device which coacts with the movement of the vehicle so that it remains stationary while the wheel is riding into position thereon. A still further object is to provide an emergency truck having wheels thereon which are so associated with a wheel mechanism as to hold the wheels elevated at the receiving end of the truck until the vehicle wheel reaches a position to cause the wheels to be lowered into traction position.

The means and mechanism covered by this invention consists substantially in the novel construction of a rolling mechanism, preferably in the form of a wheel truck, adapted to receive and support a damaged wheel, and designed so that the truck may be moved with moderate and safe speed while supporting such a wheel to the place desired.

It is a further object of my said invention to provide a wheel truck that will be light in weight and especially easy to apply and handle and be of cheap construction, consistent with strength and durability.

Figure 1:
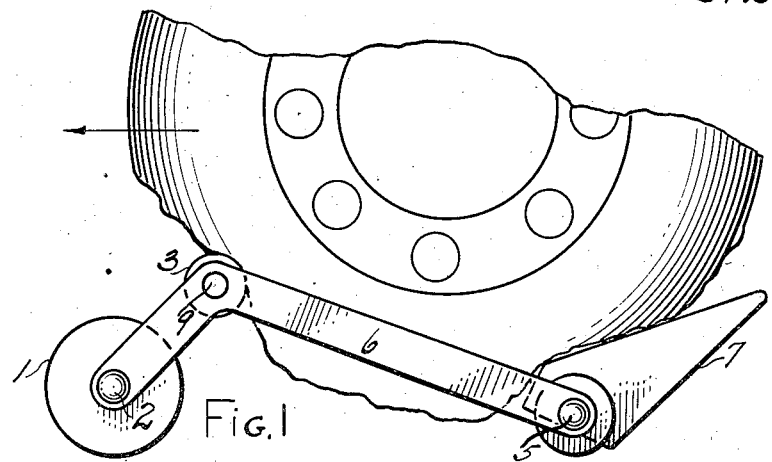
Figure 3:
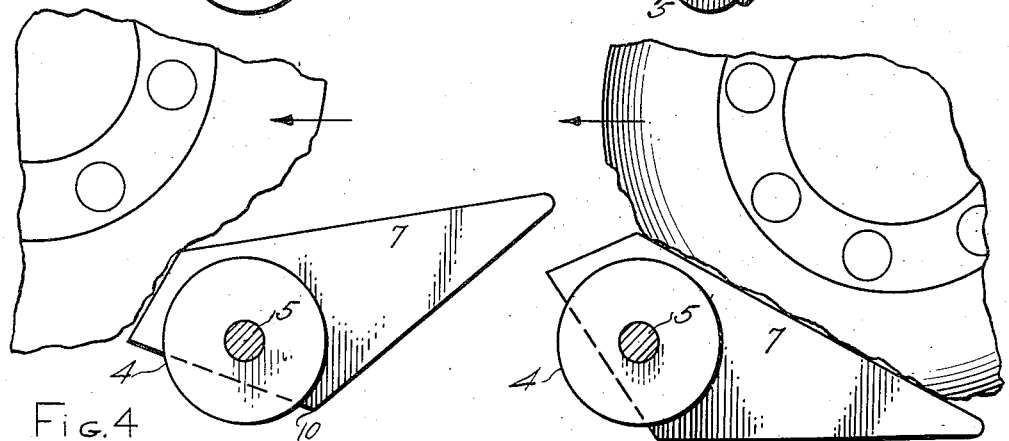

With these objects in view my invention consists in a certain novel feature of construction and arrangement of parts as will be hereinafter more fully described and pointed out in the claims, reference being had to the accompanying drawing forming part of the specification and in which Figure 1 is a side elevation of the truck with a damaged wheel mounted thereon which is shown in the form of a deflated tire. Figure 2 is a plan view of the said truck showing more clearly the arrangement of parts. Figure 3 is a view showing the position of the run on block with the wheel ready to mount the truck and especially the relative position of the rear truck wheels with the run on block, and Figure 4 shows the relative position of the run on block with the rear truck wheels after the damaged wheel has been mounted on the truck.

Figure 4:
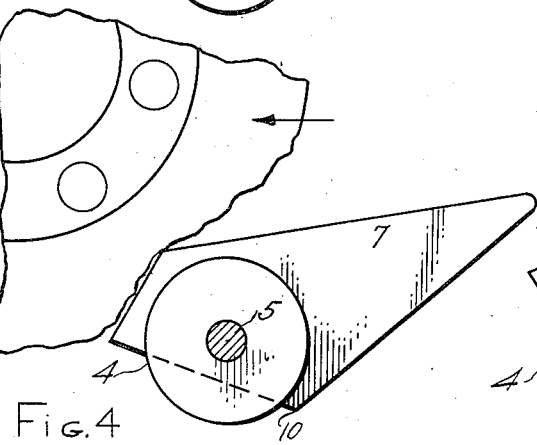

It will be observed in Figure 3 that when the run on block rests firmly on the ground it raises the rear truck wheels off the ground, while in Figure 4 when the rear of the run on block has kicked up it allows the rear truck wheels to rest firmly on the ground and take the load.

In said figures similar numerals of reference refer to similar parts throughout the several views and in which the numeral 1 designates a pair of forward truck wheels supported by the axle 2. The numeral 4 designates a pair of rear truck wheels supported by the axle 5, the said wheels 4 being preferably smaller in diameter than the front wheels 1.

The numeral 6 designates side straps in a frame each formed with one short and one long leg angularly connected in inverted V relation. The said shaft 2 is secured to the ends of the short legs of the said frame by means of the ends of the said shaft forming rivet heads, which places the said shaft in fixed relation with the side straps 6. The front wheels 1 are free to revolve on the shaft 2.

In similar manner the shaft 5 carrying the rear wheels 4 is secured to the long legs of the said straps 6 with the rear wheels 4 free to revolve on its shaft 5.

The numeral 9 designates a shaft, the ends of which are riveted to the apex of the said straps 6. The said shaft 9 is provided with rollers 3 free to revolve thereon. The said shaft 9 with the rollers thereon forms a stop or obstruction against a further forward movement of a wheel that may be mounted on the truck. By reason of the angularity of the side straps 6, the obstruction point is rearward of the front wheel axle and a predetermined distance higher than the front axle center.

The side straps 6 connecting the front and rear axles, with the wheels thereon, together with the obstruction means in the form of the said shaft 9 with the rollers thereon forms a suitable carriage to support a wheel.

The numeral 7 designates a run on block, preferably constructed from wood, revolvably mounted on the rear axle and between the two rear wheels. The contour and design of the said run on block is so shaped that the top forms a convenient incline plane to roll the wheel on the truck. The said run on block rises high enough above the top of the rear wheels to protect the rear wheels from a pneumatic tire on the wheel to be mounted. The bottom of the run-on block is constructed to form a fulcrum 10 which is so spaced from the axle 5 as to cause the block to turn to lower the wheels to traction position when the damaged wheel rides across the run-on block.

After the wheel to be mounted has ridden on the truck and the center thereof has passed the center of the rear truck wheels 4, the run on block will revolve counter-clockwise, or kick up, due to the pressure of the mounted wheel, which action allows the rear truck wheels 4 to lower in position to receive the load and rest firmly on the ground and free the run on block from any ground contact.

Having thus described the various parts throughout the several views, all of which will be readily understood by those skilled in the art to which this invention relates, its mode of operation will be substantially as follows:

Assuming an automotive vehicle wheel to be in an inoperative condition such as a deflated tire. The truck is placed directly in front of the wheel to be mounted with the run on block resting firmly on the ground and with the rear truck wheels raised free from ground contact. In this connection it has been found if the rear truck wheels are in a position to take the load, such as being in ground contact, the damaged wheel to be mounted will not ride up the incline plane and mount the truck, but instead push the truck ahead. In the construction as shown the damaged wheel will advance up the incline plane and on the truck as if the truck was a fixed object due to the rear truck wheels being off the ground.

After the damaged wheel rides over the rear truck axle, the center of gravity will move forward of the rear axle, causing the run on block to kick up and thereby dropping the rear truck wheels to the ground in a position to receive the load and free the run on block from any ground contact.

When the damaged wheel mounts the truck it will continue to move forward until it is obstructed from a further forward movement by the shaft 9 with the rollers 3 thereon. The damaged wheel will then rest firmly between the shaft 9 with the rollers thereon and the run on block 7 and will be bound sidewise by the frame straps 6. In this position the damaged wheel will be free from ground contact and ready for transportation to a place where repairs to the damaged wheel may be made.

The action of a damaged rear automobile wheel, when mounted on the truck, is quite different from a damaged front automobile wheel, by reason of the fact that no driving or turning torque is exerted on the front wheels but considerable torque is exerted by the rear wheels. In the case of a damaged front automobile wheel a moderate high barrier is satisfactory to retain the damaged wheel on the truck and the truck wheel centers may be relatively close. However, to successfully retain the rear driving wheels on the truck where torque is encountered, the forward truck wheel centers must be well beyond the point of tire or wheel pressure or else the wheel will roll off the truck regardless of how free the truck may move. In the construction as shown the forward wheel axle 2 is several inches or a predetermined distance forward of the point where forward pressure of the damaged wheel is exerted against the truck.

In the construction as shown and described I have provided rollers 3 on the shaft 9 so that the obstruction contact will be of a rolling nature. If this contact was of a fixed nature such as a simple fixed rod or shaft it would provide a purchase point for the tire to take a grip thereby making it relatively easy for the tire to roll off the truck, especially the rear wheel of an automobile where torque is encountered.

By providing a rolling contact as shown, should the damaged wheel attempt to rise while being transported, it will first move off the run on block 7 then immediately encounter a rolling resistance of the wheels 3. The damaged wheel will then attempt to revolve slightly but will immediately reset itself on the run on block 7, restoring the damaged wheel to its original position.

In the invention as shown and described the said truck may be applied readily to any inoperative wheel of an automotive vehicle by merely placing it in position in front of the said wheel where it is automatically held as the vehicle moves forward to seat the wheel on the truck thereafter the vehicle can move under its own power with relatively reduced speed to a point where the necessary repairs may be conveniently made.

It is obvious that the construction as shown and described lends itself to a light weight design, durable and strong and of cheap construction, thus accomplishing the objects of my said invention.

I am aware that certain departures may be made from the construction as shown and described without departing from the spirit and intent of my said invention.

For instance, a three wheel truck may be designed, or one or more wheels may be swiveled, or a different general design of a carriage or truck with wheels may be had, but when it is considered that such a device is made for emergency use only and in use for short durations of time, such refinements only add to the expense of manufacture and are unnecessary. What I claim as new and desire to secure by Letters Patent is:

1. In a wheel truck of the character described comprising, a set of forward wheels, an axle therefor, a set of rear wheels, an axle therefor, angular side straps connecting the two said axles, a shaft rigidly connecting the said straps at their apex, rollers on the said shaft forming an obstruction point, a run on block revolvably mounted on the rear axle, adapted to raise the rear truck wheels off the ground when a load is being run on the said truck, and then lower the rear truck wheels to the ground in a position to take their normal load, after the load is positioned on the truck, substantially as described.

2. An emergency truck comprising a frame formed of side bars, a front axle and a rear axle, and an intermediate support, each side bar consisting of a long arm and a short arm converging upwardly to an apex for supporting an end of said intermediate support, the angle of said short arm with respect to said long arm being such that a plane including said intermediate support and said front axle passes forwardly to the center of gravity of a vehicle wheel resting on said frame, wheels on the respective axes, and means coacting with the rear axis to guide a vehicle wheel onto said frame, said means acting as a lever during a portion of the movement of said vehicle wheel to elevate said rear wheels, whereby said frame is held against movement while mounting said vehicle wheel.

DAVID R. KNAPP.